Figure 1:
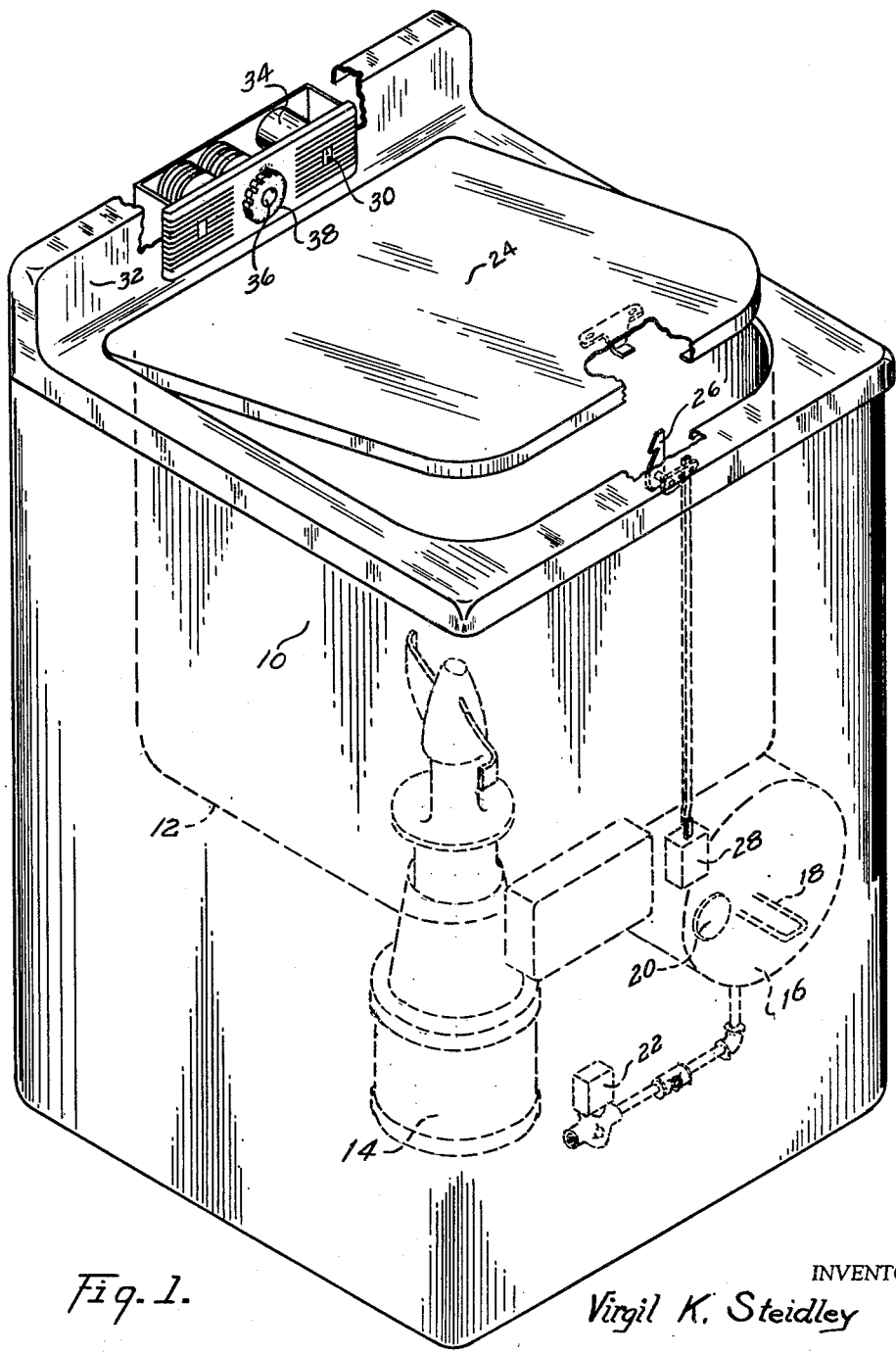

Feb. 19, 1957 V. K. STEIDLEY 2,781,765
OPERATIONAL CYCLE FOR DISHWASHERS
Filed May 1, 1953 2 Sheets-Sheet 1

INVENTOR
Virgil K. Steidley
BY
ATTORNEY

United States Patent Office 2,781,765
Patented Feb. 19, 1957

2,781,765

OPERATIONAL CYCLE FOR DISHWASHERS

Virgil K. Steidley, Jackson, Mich., assignor, by mesne assignments, to The Apex Electrical Manufacturing Company, Cleveland, Ohio, a corporation of Ohio Application May 1, 1953, Serial No. 352,491

5 Claims. (Cl. 134—57)

The present invention relates to improvements in the operation of automatic dishwashers being particularly adaptable to dishwashers of the type disclosed in co-pending application Serial No. 638,273, filed December 29, 1945, now Patent No. 2,671,455, granted March 9, 1954.

To efficiently wash the dishes and silverware in an automatic dishwasher, it has been found necessary, even with improved detergents, that water temperatures for both washing and rinsing be maintained in the order of 175° F. to 185° F. Also, it has been found desirable to provide more than one rinse following the washing operation.

When the dishwasher is provided with its own water heater storage tank as disclosed in the aforesaid application, the addition of a second hot water rinse in the cycle of operation would necessitate an increase in the make-up capacity of the water heater if the complete time cycle is to remain of the same duration. The problem is further complicated by the fact that the water heater tank associated with the dishwasher preferably draws its supply of water from the domestic hot water system, the temperature of which may fluctuate over a relatively wide range depending upon the demands being made upon it.

In order to hold the size of the water heater storage tank located within the dishwasher cabinet to a minimum and at the same time to avoid increasing the capacity of the electric heater in the tank, yet supply water of desired temperature for each portion of the cycle of operation, I propose to thermostatically interrupt the cycle. For example, the temperature of the water being supplied to the water heater storage tank of the dishwasher will determine the length of time required to heat the stored water in the dishwasher to the desired temperature. The lower the temperature of the water entering from the domestic hot water system, the longer will be the heating time required to bring the water within the tank up to the desired temperature for the first and second rinses.

According to the present invention, the timer motor which determines the length and sequence of the various operations of the dishwasher cycle is thermostatically controlled to provide sufficient time interval for the water in the storage tank of the dishwasher to be raised to a predetermined temperature. Thus, the total lapse of time of the complete automatic cycle of operation of the dishwasher will vary depending upon the rate of recovery of the water heater. Preferably, the washing time is extended the necessary amount to enable the water heater more time within which to raise the stored water to the desired temperature for the first rinse. Likewise, a similar interruption may take place during the first rinse to provide water of the desired temperature for the second rinse.

The principal object of the invention is to provide a new combination of elements in the sequence control of an automatic dishwasher whereby the duration of the complete cycle is continued beyond the minimum duration to enable sufficient time within which to bring the water up to temperature before initiating the next operation which draws upon the hot water supply.

Another object is to provide a new combination of elements in the sequence control of an automatic dishwasher in which the duration of one or more operations automatically performed is continued beyond the minimum permissible duration to enable additional time within which to raise the temperature of the water supply before initiating the next operation which draws upon that supply.

Another object of the invention is to provide an improved automatic dishwasher of the type having its own water heater storage tank in which the timer controlling the duration and sequence of each operation is interrupted by the temperature control mechanism for the water heater.

A further object of the invention is to provide an improved automatic dishwasher of the type having its own water heater storage tank in which the timer controlling the duration and sequence of each operation is interrupted by the temperature controlling means for the water heater by having an electric motor for the operation of the timer selectively placed either in series or in shunt with respect to the electric water heater through the thermostatic control means of the water heater.

These and other objects and advantages residing in the present invention will become apparent from the following specification and claims and reside in the specific arrangement and combination of the component parts.

Figure 2:
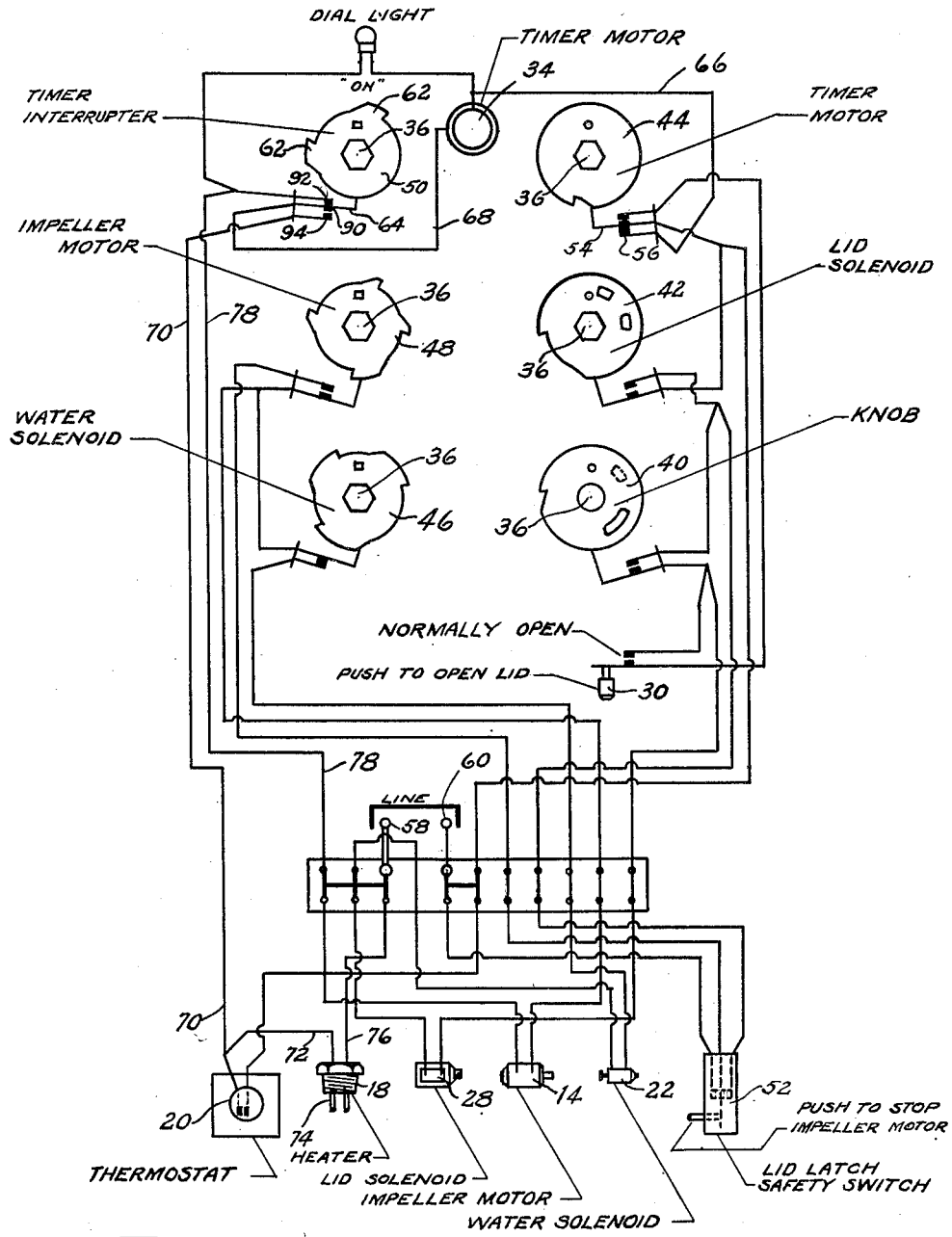

In the drawings,

Fig. 1 is a perspective view of a dishwasher cabinet with certain of its component parts diagrammatically illustrated, and Fig. 2 is a wiring diagram of an automatic dishwasher embodying the principles of the present invention with the essential operating parts diagrammatically shown.

Referring to the illustrated embodiment of the invention, in Fig. 1 a dishwasher cabinet 10 is shown having a vat 12 in which the dishes are washed and rinsed with the washing and rinsing water being agitated through the impeller motor 14. A water heater storage tank 16 is shown below the vat 12 equipped with an electric heater 18 and controlled by a thermostat 20. Hot water from the tank 16 is admitted in metered quantities to the vat 12 by the water solenoid valve 22. The lid 24 may be spring biased in the manner shown in the aforesaid application when unlatched to the position shown. A latch 26 actuated by the solenoid 28 releases the lid to vent the steam from the vat 12 at the end of the completed cycle. Manual actuation of the solenoid 28 is through the lid button 30 on the panel 32. Back of the panel 32 is mounted the timer motor 34 which through suitable gearing (not shown) actuates the cam shaft 36 upon which the manual control knob 38 is mounted on its outer end.

For a more complete disclosure of the dishwasher mechanism, such as the drain mechanism (not shown), plumbing connections, and the like, reference may be made to the aforesaid co-pending application, the disclosure of which only departs materially from the construction diagrammatically shown in Fig. 1 with respect to the use of a solenoid latch for the lid 24 and the location of the timer 34 back of the panel 32. It is to be understood that the present invention is especially adapted to the type of dishwasher shown in the aforesaid co-pending application with the invention residing in the combination of elements employed in controlling and co-ordinating the heating and consumption of water and the relationship to the automatic cycle of operation of the dishwasher.

Through suitable gearing (not shown) the timer motor 34 rotates the shaft 36 upon which the cams 40, 42, 44, 46, 48 and 50 are carried. Cams 40 and 42 control the operation of the lid 24 and restrict the function of the lid button 30 and impellor motor 14 through the safety switch 52. As these cams to do enter into the novel control mechanism to which the present invention relates no detailed description of their function is required in view of the disclosure of Fig. 2. A similar situation exists with respect to the cam 48 which controls the impeller motor 14.

The novelty of the present invention is concerned with the correlation of actuation by the timer motor 34 of the shaft 36 and the temperature of the water in the tank 16. Preferably, the shaft 36 is directly geared to the timer motor 34 which necessitates stopping the motor 34 to stop the shaft 36. However, it is obvious that a suitable clutch or equivalent structure may be imposed between the shaft 36 and the motor 34 and, thus, interrupt the drive of the shaft 36 without stopping the timer motor 34.

As shown, when the shaft 36 is rotated clockwise manually by the knob 38 to raise the cam follower 54 to close the contact 56, the timer motor 34 is placed in a closed circuit with the line terminals 58 and 60. This is the start of the washing cycle and normally the water temperature in the storage tank 16 will be in the order of 180° with the heater 18 shut off by the thermostat 20. Rotation of the cam 46 by the timer motor 34 will meter the required amount of hot wash water into the vat 12 and the washing operation under the control of the timer motor 34 will continue for approximately fifteen minutes, by way of example. In practice, the tank 16 in a domestic dishwasher will have a capacity in the order of two gallons of water of which approximately six quarts are withdrawn at the start of the washing cycle. As the water drawn into the tank 16 from a domestic water system is normally well below 180° F. it becomes necessary for the heater 18 to raise the temperature of the tank 16 to the order of 180° F. during the washing cycle in order to have an adequate supply for rinsing.

It is proposed, by the present invention, to provide a timer interrupter cam 50 on the shaft 36 having one or more lifts 62, depending upon the number of rinsing operations. The first lift 62 to engage the cam follower 64 is so located upon the cam 50 to open the timer circuit just short of the end of the washing part of the cycle. If the thermostat 20 is still calling for heat indicating that the water in the tank 16 is below the desired rinsing temperature, the shaft 36 stops its rotation and the washing of the dishes will continue beyond the minimum duration of the washing cycle until the circuit in which the timer motor is located is again modified or is otherwise rendered inoperative to rotate the shaft 36. Where a second rinse is provided, the second lift 62 is located on the cam 50 adjacent the end of the first rinse. Thus, if the water temperature in the tank 16 at the end of the first rinse is below the desired temperature, the rotation of the shaft 36 is again interrupted until the thermostat 20 is satisfied. Obviously, a great many different arrangements for interrupting the actuation of the shaft 36 by the timer motor 34 will readily occur to those skilled in the art. In the illustrated form, the conductor 66 connects one side of the timer motor 34 with the line terminal 60 as may be readily traced from Fig. 2. The other side of the timer motor 34 connects with the terminal 58 through conductors 68, 70, 72, 74 and 76 when the follower 64 is on one of the lifts 62 and through the conductor 78 with the follower 64 between the lifts 62. It is to be understood that the follower 64 carries a suitable snap action contact switch element 90 which assures the completion of the contact with one or the other of the conductor branches 70 and 78.

When the cycle of the dishwasher is initiated, the follower 64 will be in the position shown in Fig. 2 with the contact 90 engaging the contact 92 of the conductor 78. As the washing operation continues, the first lift 62 will eventually engage the follower 64 to move the same snapping the contact 90 into the electrical engagement with the contact 94 of the conductor 70.

If the thermostat 20 is closed indicating that the water in the tank 16 has been insufficiently heated the timer motor 34 will be in a circuit shunted across the thermostat 20 of the closed circuit in which the heater 18 is then located. As the resistance across the thermostat 20 is slight, insufficient current will flow in the shunted timer motor circuit to operate the timer motor 34. However, when the thermostat 20 is opened by the desired raise in water temperature in the tank 16, the timer motor 34 is no longer shunted across the thermostat 20 of the heater circuit but is placed in series with the heater 18 and sufficient current flows through the heater 18 to actuate the timer motor 34 but insufficient to operate the heater. Thus, the interruption of the cycle of the dishwasher is arrested and the timer motor 34 will again rotate the shaft 36 to continue the sequence of automatic operation.

It should be apparent from the foregoing description that if the temperature in the tank 16 is sufficiently high to open the thermostat 20, when the cam follower 64 engages with one of the lifts 62, that the cycle of operation will not be interrupted and the timer motor 34 will continue to rotate the shaft 36. However, if the thermostat 20 is in a closed position and the water in the tank 16 is being heated when the lift 62 is engaged by the cam follower 64, interruption of the operation of the timer motor 34 will take place and the duration of the complete cycle of operation of the diswasher will be increased amounts equal to the duration of the interruption of the timer motor 34 while the water in the tank 16 is being brought up to the proper temperature for consumption in the operation to follow.

Having thus described my invention what I claim is new and desire to protect by Letters Patent is:

1. In an automatic dishwasher having a storage tank from which heated water is drawn for washing and rinsing, a vat in which the dishes are washed and rinsed and control mechanism for regulating the sequence of operation of the dishwasher, the combination of water heating means for the storage tank, timer means for initiating each operation of the dishwasher and determining the minimum duration thereof, and thermostatic means responsive to the temperature of water in the storage tank and operatively connected to said timer means to arrest its effective operation to increase the time interval between operations beyond said minimum pending the heating of the water to a predetermined temperature.

2. In an automatic dishwasher as defined in claim 1, said timer means being in the form of a motorized timer mechanism, said mechanism having means for determining the duration of the washing operation, and means operatively connecting said thermostatic means to said timer means to extend the duration of the washing operation dependent upon the water temperature of said tank.

3. In an automatic dishwasher as defined in claim 1, said timer means being in the form of a motorized timer mechanism, said mechanism having means for determining the duration of the washing and rinsing operations, and means operatively connecting said thermostatic means to said timer means to extend the duration of the washing and rinsing operations dependent upon the water temperature of said tank.

4. In an automatic dishwasher, the combination of a water heater storage tank, a vat into which water from said tank is supplied during the washing and rinsing operations, timer means for controlling the sequence and duration of each of said operations, means responsive to the temperature of the water in said tank, a heater for said tank, and means under the control of said last means for rendering said timer means inoperative below a predetermined water temperature in the tank during the duration of said operations whereby to extend the same pending the heating of the water to said predetermined temperature.

5. In an automatic dishwasher as defined in claim 1 wherein said heating means is in the form of an electric heater circuit having an electrical conductive heating element, said thermostatic means being connected in series with said element, said timer means being electrically activated, a pair of circuits for said timer means one of which is in shunt with said thermostatic means with said thermostatic means calling for heat and in series with said element, and interrupter means for said timer means for selecting said circuits.

References Cited in the file of this patent

UNITED STATES PATENTS

| | | |
|---|---|---|
| 1,323,216 | Cornwall et al. | Nov. 25, 1919 |
| 2,701,574 | Hollerith | Feb. 8, 1955 |